United States Patent

[11] 3,574,378

| [72] | Inventor | James H. Heywood<br>1411 Doncaster Drive, Youngstown, Ohio 44511 |
|---|---|---|
| [21] | Appl. No. | 827,531 |
| [22] | Filed | May 26, 1969 |
| [45] | Patented | Apr. 13, 1971 |

[54] STRENGTHENING INSERT AND FASTENER FOR TUBULAR CONSTRUCTIONS
5 Claims, 10 Drawing Figs.

[52] U.S. Cl. ..................................................287/189.36,
52/656, 160/381
[51] Int. Cl. ....................................................... F16b 7/04
[50] Field of Search............................................287/54 (A),
54 (B), 54 (C), 189.36, 189.36 (C), 189.36 (F),
189.36 (H), 23(Cursory); 160/381; 49/(Inquired);
52/656

[56] References Cited
UNITED STATES PATENTS

| 2,004,727 | 6/1935 | Keller | 287/189.36H |
| 2,238,111 | 4/1941 | Hain | 52/656X |
| 2,717,061 | 9/1955 | Katz | 52/656X |
| 3,051,517 | 8/1962 | Yalen | 287/189.36FX |
| 3,275,356 | 9/1966 | Heywood | 160/381X |
| 3,353,853 | 11/1967 | Heywood | 287/189.36FX |
| 3,118,694 | 1/1964 | Bernard | 287/189.36X |

Primary Examiner—David J. Williamowski
Assistant Examiner—Wayne L. Shedd
Attorney—Webster B. Harpman ABSTRACT: A strengthening insert and fastener for a tubular construction including one portion having expandable members engageable in one tube and an attached movable fastener extending outwardly therefrom and engaging a fixed elongated complementary fastener and reinforcing member in another tube.

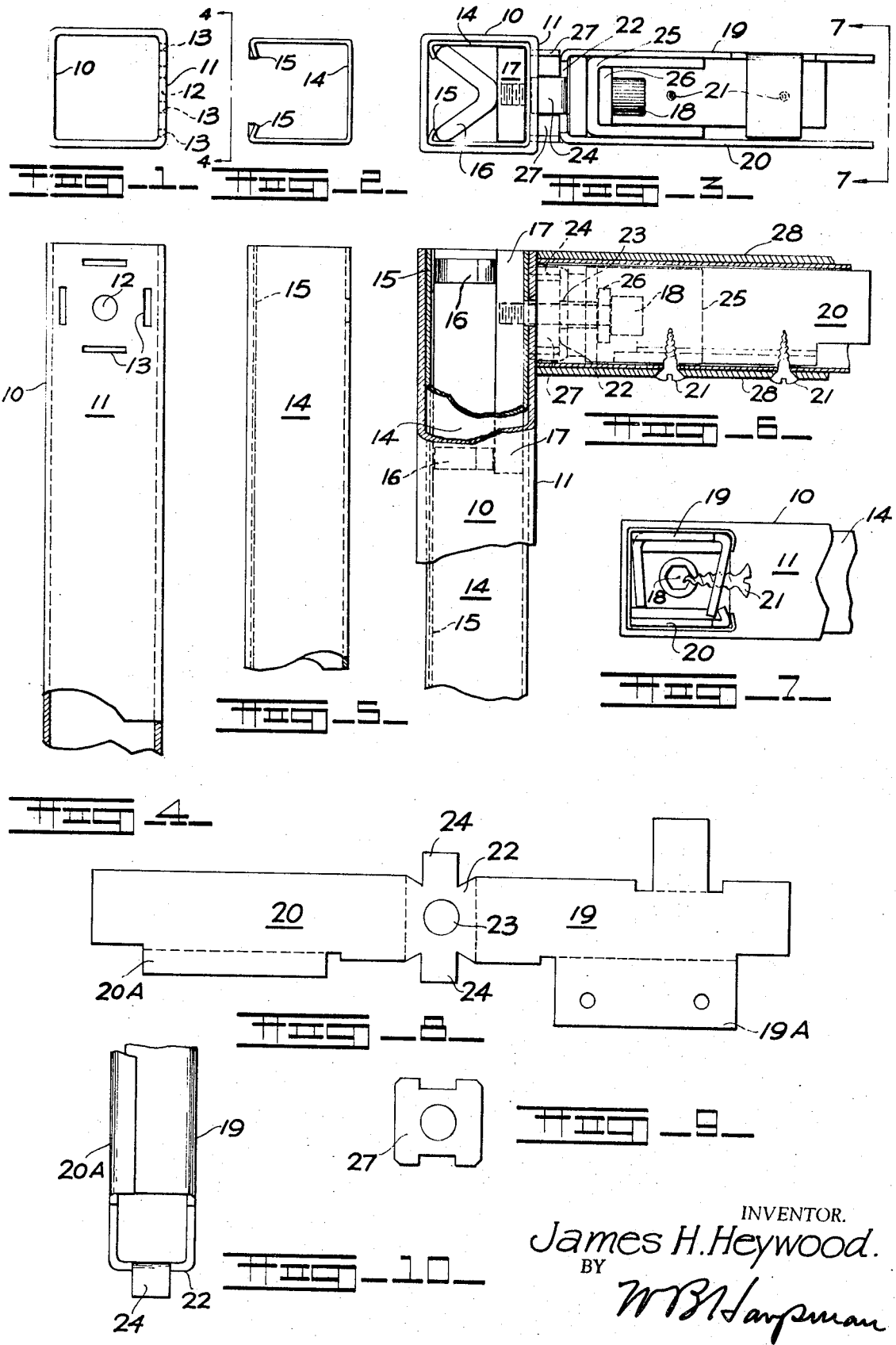

3,574,378

STRENGTHENING INSERT AND FASTENER FOR TUBULAR CONSTRUCTIONS

BACKGROUND OF THE INVENTION

1. Field of the Invention

This invention relates to tube connecting fasteners and strengthening members for joining the ends of tubular metal shapes and the like to one another or for joining an end of one tubular shape to the side of another of like configuration and wherein the tubular metal shapes are reinforced by the fastener and strengthening device in the areas in which the fastener and strengthening devices are located so as to prevent failure of the tubular shapes as otherwise occurs.

2. Description of the Prior Art

Prior structures of this type have related almost entirely to devices for joining one tubular shape to another as seen for example in U.S. Pat. Nos. 2,941,855, 2,972,495 and my earlier U.S. Pat. No. 3,353,853.

The present invention eliminates failure which regularly occurred in the area of the fasteners when the joints formed thereby were subjected to unusual stress.

SUMMARY OF THE INVENTION

A strengthening insert and fastener for tubular constructions includes a simple inexpensive tube connecting fastener arranged to hold one piece of tubing with its end in abutting relation to the side of another piece of tubing of similar DESCRIPTION and wherein all of the fastener and fastening means are hidden within the pieces of tubing being joined and wherein the one portion of the fastener includes expandable clamping and reinforcing members anchored by metal screws and the other portion of the tube connecting fastener includes an elongated reinforcing channel, an elongated metal nut and means positioning the nut in the channel whereby the sections of tubing in which the respective portions of the fastener are positioned are reinforced over a relatively large area extending substantially beyond the area of the actual joint formed by the fastener.

DESCRIPTION OF THE DRAWINGS

FIG. 1 is a top plan view of a section of tubing.

FIG. 2 is a top plan view of a section of reinforcing channel for insertion in the tubing of FIG. 1.

FIG. 3 is a top plan view of an expandable fastener illustrating one portion disposed in the tubing and reinforcing channel of FIGS. 1 and 2.

FIG. 4 is a side elevation of the section of tubing seen in FIG. 1 turned a quarter turn with respect to FIG. 1.

FIG. 5 is a side elevation of the section of reinforcing channel seen in FIG. 2 and FIG. 6 is a side elevation with parts broken away and parts in cross section illustrating the strengthening and fastening device of FIG. 3 disposed in two sections of metal tubing joined thereby.

FIG. 7 is an end view on line 7—7 of FIG. 3.

FIG. 8 is a plan view of the blanked metal shape from which portions of the fastener seen in FIGS. 3, 6 and 7 are formed.

FIG. 9 is a plan view of a metal piece used in the fastener illustrated in FIGS. 3, 6 and 7.

FIG. 10 is a side elevation of a portion of the fastener seen in FIGS. 3, 6 and 7 as formed from the blanked metal shape illustrated in FIG. 8.

DESCRIPTION OF THE PREFERRED EMBODIMENT

As illustrated herein the strengthening insert and fastener for tubular constructions comprises two portions, one disposed in each of the tubular members being joined to one another.

In FIGS. 1 and 4 of the drawings a first tubular metal shape 10 is illustrated, a side 11 of which has a bolt receiving opening 12 and tab receiving slots 13 formed therein, an elongated channel section 14 is illustrated in FIGS. 2 and 5 with the longitudinal edges of the channel having in turned angular flanges 15. In FIGS. 3 and 6 of the drawings the first tubular metal shape 10 is shown with the channel section 14 disposed therein with the inturned flanges 15 positioning a pair of V-shaped supports 16 which in turn engage a nut 17 also positioned within the channel section 14 and thereby located within the first tubular metal shape 10. A threaded opening in the nut 17 is aligned with the opening 12 in the first tubular metal shape 10 and is thereby capable of receiving one end of a bolt 18 the rest of which is positioned through an opening in the other portion of the strengthening insert and fastener for tubular constructions as seen in FIGS. 3 and 6 of the drawings. The bolt 18 which is shown with a knurled head passes through the base of a U-shaped portion 19 of an expandable clamping device such as disclosed in my U.S. Pat. No. 3,353,853 and wherein oppositely disposed flanges 19' and 20 are arranged so that they can be moved into expanding relation to one another through the actuation of a pair of metal screws 21 engaging the same as best seen in FIGS. 6 and 7 of the drawings and in the aforesaid patent. The flanges 19 and 20 are formed from the metal blank seen in FIG. 8 and it will be observed that in their assembled form as seen in FIGS. 3, 6 and 7 of the drawings they are in spaced parallel relation with a joining web portion 22 spacing the same. The center portion of the blank seen in FIG. 8 forms the web 22 and the opening 23 therein forms a passageway for the bolt 18 heretofore referred to. Oppositely disposed tabs 24 formed on the central section of the blank are eventually formed at right angles in an opposite direction to the flanges 19 and 20 and register with a pair of the slots 13 in the side 11 of the first tubular metal shape 10 when the fastener is engaged there against and the bolt 18 turned into the nut 17.

In order that the flanges 19 and 20 formed of the blank seen in FIG. 8 may be held in desirable relation as hereinbefore described a U-shaped member 25 is disposed therebetween and welded thereto and it is apertured so that the bolt 18 may pass therethrough. A washer 26 is positioned between the head of the bolt 18 and the U-shaped member 25 and a notched plate 27 centrally apertured is positioned between the side 11 of the first tubular metal shape 10 and the web portion 22 of the member forming the flanges 19 and 20. This notched plate 27 is a support between side 11 and web portion 22 to hold them flat.

The formation of the blank of FIG. 8 into the described construction is partially illustrated in FIG. 10 of the drawings and by referring thereto it will be seen that the oppositely disposed flanges 19 and 20 may be seen and it will be observed that each of them has a right angular flange 19A and 20A respectively which are also illustrated in the blank form of FIG. 8.

By referring now to FIG. 6 of the drawings it will be seen that a second tubular metal shape 28 is illustrated in position over the second described portion of the strengthening insert and fastener for tubular constructions herein disclosed and that the illustration of FIG. 6 is a side elevation of the same arrangement seen in FIG. 3 in top plan view plus the second tubular metal shaped 28.

It will be observed that the point of engagement of the second tubular metal shape 28 with the first tubular metal shape 10 is in a limited area on the side 11 thereof and that all of the stress of the fastening will accordingly be carried directly by this limited area of the tubular metal shape 10. In order to prevent failure of the wall structure of the tubular metal shape 10 the channel section 14 is telescopically engaged therein which in itself offers considerable reinforcement. Additionally, the elongated nut 17 is disposed within the channel section 14 and held in fixed, tensioned relation by the V-shaped supports 16 of which there are two as seen in FIG. 6 of the drawings. The V-shaped supports are in turn engaged against the inturned flanges 15 of the channel section 14 so that there is a resilient tensioning of the assembly.

A wrench positioned longitudinally of the assembly between the flanges 19 and 20 and engaged in a socket in the head of a bolt 18 as may be seen in FIG. 7 is used to rotate the bolt 18 and tighten the assembly as shown and described so that the strengthening insert and fastener for tubular constructions is firmly assembled to a reinforced portion of the first tubular metal shape 10 and as illustrated in FIG. 3 of the drawings. When this has been completed the second tubular metal shape 28 is slid telescopically over the fastener portion of the device and the metal screws 21 are engaged through openings in the same to engage openings in the flange 19A which causes the same to expand and securely lock to the second tubular metal shape 28. This locking action is also facilitated by the positioning of the metal screws 21 through openings in the second tubular metal shape 28.

Thus, the construction inserted within the first tubular metal shape 10 reinforces it over a relatively long portion of its area and prevents fracture of the wall thereof when the finished joint in a furniture construction for example is tensioned or stressed and the fastener construction engaged in the second tubular metal shape 28 reinforces the same and holds it secure against fracture and bending in a similar manner.

The strengthening insert and fastener for a tubular construction disclosed herein therefore forms a practical and efficient means of joining tubular metal members in furniture frames and the like without the necessity of welding the same as has heretofore been commonplace, and at the same time, reinforces the structures joined so as to insure their long and satisfactory service despite unusual stresses and tensions that may be placed on the joints so formed.

Although but one embodiment of the present invention has been illustrated and described, it will be apparent to those skilled in the art that various changes and modifications may be made therein without departing from the spirit of the invention or from the scope of the appended claims.

I claim:

1. In a strengthening insert and fastener for tubular constructions including a U-shaped body member having a base portion and spaced arm portions, said base portion having a projecting shoulder of desirable configuration and said arm portions having a pair of oppositely disposed longitudinally extending expansion members secured thereto in spaced relation, said flanges being apertured to receive metal screws for distorting said flanges to increase the effective spacing thereof, and a bolt positioned through the base of said U-shaped body member and extending in a direction opposite to said expansion members, an elongated nut on said bolt, an apertured channel, at least one V-shaped support in said channel, support and elongated nut adapted to be positioned in a first tubular member and said U-shaped body member with the longitudinally extending expansion members being adapted to be positioned in a second tubular member.

2. The strengthening insert and fastener set forth in claim 1 and wherein said apertured channel has inturned secondary flanges and said V-shaped support is engaged against said inturned secondary flanges and said elongated nut.

3. The strengthening insert and fastener of claim 1 and wherein said apertured channel and said elongated nut are of a greater length than the total width of said base portion and spaced arm portions of said U-shaped body member.

4. The strengthening insert and fastener of claim 1 and wherein the desirable configuration of said projecting shoulder of said base portion takes the form of a pair of spaced projecting tabs for registry in apertures in said second tubular member on either side of an aperture therein through which said bolt is positioned.

5. The strengthening insert and fastener of claim 1 and wherein the tubular constructions comprise cross-sectionally square metal tubing and the U-shaped body member, its base portion and spaced arm portions are engaged axially in the end of one of said cross-sectionally square metal tubes with the projecting shoulder extending out of the end thereof and the apertured channel elongated nut and V-shaped support are telescopically engaged in the other of said cross-sectionally square metal tubes with the opening in said elongated nut in which said bolt is engaged registering with an aperture in said other cross sectionally square metal tube and the projecting shoulder of desirable configuration comprising tabs engaging secondary apertures in said other cross-sectionally square metal tube.